(12) United States Patent
Lazarovich et al.

(10) Patent No.: US 9,771,149 B2
(45) Date of Patent: Sep. 26, 2017

(54) GATE DEPARTURE SYSTEM FOR AIRCRAFT

(71) Applicant: HONEYWELL INTERNATIONAL INC., Morris Plains, NJ (US)

(72) Inventors: David Lazarovich, Thornhill (CA); Nicolae Morcov, Mississauga (CA); Marius Pleniceanu, Mississauga (CA)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 83 days.

(21) Appl. No.: 14/927,873

(22) Filed: Oct. 30, 2015

(65) Prior Publication Data

US 2017/0121012 A1 May 4, 2017

(51) Int. Cl.
| | | |
|---|---|---|
| *G01C 23/00* | (2006.01) | |
| *G05D 1/00* | (2006.01) | |
| *G05D 3/00* | (2006.01) | |
| *B64C 25/40* | (2006.01) | |
| *B64C 25/34* | (2006.01) | |
| *B64C 25/50* | (2006.01) | |
| *B64D 41/00* | (2006.01) | |

(52) U.S. Cl.
CPC .......... *B64C 25/405* (2013.01); *B64C 25/34* (2013.01); *B64C 25/50* (2013.01); *B64D 41/00* (2013.01); *B64D 2221/00* (2013.01)

(58) Field of Classification Search
CPC ......... B64C 25/405; B64C 25/42; B64C 5/02; B64C 2025/345; B64C 25/34; B64C 25/50; G08G 5/065; G08G 5/0013; G08G 5/06; G08G 5/0065; G05D 1/0202; B64D 27/00; B64D 2205/00; B64D 41/00; B64F 1/002; B60K 2007/003; B60T 1/10; G09B 19/165
See application file for complete search history.

(56) References Cited

U.S. PATENT DOCUMENTS

| | | | |
|---|---|---|---|
| 5,813,630 A * | 9/1998 | Williams | ............... B64D 13/06 244/118.5 |
| 7,445,178 B2 | 11/2008 | McCoskey et al. | |
| 7,975,960 B2 | 7/2011 | Cox et al. | |
| 8,267,350 B2 * | 9/2012 | Elliott | ..................... B64C 13/34 244/102 R |
| 8,474,749 B2 | 7/2013 | Cros et al. | |
| 8,528,856 B2 | 9/2013 | Charles et al. | |
| 8,684,300 B2 * | 4/2014 | Wilson | .................. B64C 25/405 244/100 R |
| 9,033,273 B2 | 5/2015 | Edelson et al. | |
| 9,073,632 B2 | 7/2015 | Baumann | |
| 9,630,708 B2 * | 4/2017 | Lo | ........................... B64C 25/42 |
| 2005/0284150 A1 * | 12/2005 | Dittmar | .................. B64D 41/00 60/788 |
| 2007/0158497 A1 * | 7/2007 | Edelson | ................ B64C 25/405 244/103 S |

(Continued)

*Primary Examiner* — Khoi Tran
*Assistant Examiner* — Jorge Peche
(74) *Attorney, Agent, or Firm* — Shimokaji IP

(57) ABSTRACT

A gate departure system for an aircraft includes an electric traction motor for driving a wheel of a main landing gear assembly of the aircraft on only one side of the aircraft; and a controller selectively connected to a starter-generator of an auxiliary power unit (APU) and to the traction motor to control flow of electrical power to either the starter-generator for starting of the APU or the electric traction motor for driving the wheel.

6 Claims, 4 Drawing Sheets

(56) References Cited

U.S. PATENT DOCUMENTS

| | | | |
|---|---|---|---|
| 2008/0217466 A1* | 9/2008 | Bhargava | B64C 25/40 244/50 |
| 2009/0072080 A1* | 3/2009 | Bhargava | B64C 25/405 244/58 |
| 2011/0084550 A1* | 4/2011 | Nierlich | B64C 25/30 307/9.1 |
| 2012/0104158 A1* | 5/2012 | Charles | B64C 25/405 244/50 |
| 2012/0104159 A1* | 5/2012 | Charles | B64C 25/405 244/50 |
| 2012/0168557 A1* | 7/2012 | Edelson | B64C 25/405 244/50 |
| 2012/0217339 A1* | 8/2012 | Gilleran | B64C 25/405 244/50 |
| 2012/0292437 A1 | 11/2012 | Garcia et al. | |
| 2013/0048781 A1 | 2/2013 | Berenger et al. | |
| 2013/0062459 A1* | 3/2013 | Cox | B64C 25/405 244/50 |
| 2013/0138584 A1* | 5/2013 | Vana | G06Q 90/00 705/500 |
| 2013/0181088 A1* | 7/2013 | Casado Montero | B64D 41/00 244/50 |
| 2013/0200209 A1* | 8/2013 | Goldman | B64C 25/405 244/50 |
| 2013/0200210 A1* | 8/2013 | Oswald | B64C 25/405 244/50 |
| 2013/0297102 A1* | 11/2013 | Hughes | G05D 1/0083 701/3 |
| 2013/0320136 A1* | 12/2013 | Zhou | B64D 41/00 244/58 |
| 2014/0008488 A1 | 1/2014 | Buzzard | |
| 2014/0061374 A1* | 3/2014 | Cox | B64C 25/405 244/50 |
| 2014/0114557 A1* | 4/2014 | Nutaro | G01C 21/00 701/121 |
| 2014/0138479 A1* | 5/2014 | Vieillard | B64C 25/405 244/50 |
| 2014/0193780 A1* | 7/2014 | Cox | G09B 19/165 434/37 |
| 2014/0225421 A1* | 8/2014 | Oswald | B64C 25/405 301/6.2 |
| 2014/0278037 A1* | 9/2014 | Choksi | G08G 5/065 701/120 |
| 2014/0336847 A1* | 11/2014 | Cox | B64C 25/405 701/3 |
| 2015/0008286 A1* | 1/2015 | Cox | B64F 1/30 244/137.2 |
| 2015/0021431 A1* | 1/2015 | Kracht | B64F 1/00 244/50 |
| 2015/0042155 A1* | 2/2015 | Vieillard | B60R 16/0307 307/9.1 |
| 2015/0045167 A1* | 2/2015 | Lee | F16H 47/04 475/72 |
| 2015/0051757 A1* | 2/2015 | Cox | B64D 45/00 701/3 |
| 2015/0076280 A1* | 3/2015 | Cox | B64C 25/405 244/50 |
| 2015/0097077 A1* | 4/2015 | Himmelmann | B64C 25/405 244/50 |
| 2015/0097078 A1* | 4/2015 | Mueller | B64C 25/405 244/50 |
| 2015/0129712 A1 | 5/2015 | Cox et al. | |
| 2015/0142214 A1* | 5/2015 | Cox | G05D 1/0083 701/3 |
| 2015/0151834 A1* | 6/2015 | Cox | B64C 25/405 701/3 |
| 2015/0151835 A1* | 6/2015 | Cox | B64C 25/405 244/50 |
| 2015/0203193 A1* | 7/2015 | Cox | B64C 25/405 701/2 |
| 2015/0221224 A1* | 8/2015 | Cox | G08G 5/0013 244/50 |
| 2015/0329202 A1* | 11/2015 | Cox | B64C 25/50 244/103 S |
| 2015/0353207 A1* | 12/2015 | Cox | B64F 1/00 14/71.1 |
| 2016/0016659 A1* | 1/2016 | Cox | B64C 25/405 244/50 |
| 2016/0039371 A1* | 2/2016 | Blumer | B60L 11/02 290/31 |
| 2016/0070266 A1* | 3/2016 | DiVito | H02J 7/0055 307/9.1 |
| 2016/0159470 A1* | 6/2016 | Cox | B64C 25/405 29/401.1 |
| 2016/0349752 A1* | 12/2016 | Fusaro | G05D 1/0202 |

* cited by examiner

GATE DEPARTURE SYSTEM FOR AIRCRAFT

BACKGROUND OF THE INVENTION

The present invention relates generally to movement of an aircraft during ground-based operations. More particularly, the invention relates to an electric taxi system (ETS) for moving an aircraft away from a terminal gate.

In traditional commercial aircraft operations, an aircraft may be positioned at a terminal gate for discharging and loading of passengers. After completion of loading, a ground-based tractor or tug may be employed to push the aircraft in a reverse direction away from the gate and to move the aircraft into a position from which the aircraft may begin taxiing under its own power. Use of such tugs contributes to increased operational costs. In some instances a tug and its operator may not be readily available at a desired aircraft-departure time and such unavailability may result in operational delays.

Comprehensive electric taxi systems (ETS) are currently being developed for modern aircraft. Such systems may employ multiple electric motors to drive landing gear wheels during aircraft ground movement and taxiing. An aircraft equipped with such a comprehensive ETS may be able to move away from a gate under its own power without a need for a tractor.

In a typical comprehensive ETS, electrical power for the motors may be supplied from an auxiliary power unit (APU) of the aircraft. Main engines of the aircraft may remain off while the aircraft is propelled on the ground by the electric motors, thus saving the expense of fuel. Substantial weight may be added to an aircraft by installation of a comprehensive ETS. This added weight may result in added in-flight fuel consumption.

Consequently, not every commercial aircraft is a good economic candidate for a comprehensive ETS because of an economic trade-off, between ground-level fuel savings, added in-flight fuel cost and the cost of installing an ETS. An aircraft that makes many short flights in a day may realize overall fuel cost savings because it may spend much of its work day performing ground level movement. The cost of installing an ETS in such an aircraft may be economically justifiable. An aircraft that is employed in long-haul routes may suffer added overall fuel cost by carrying the weight of a compressive ETS over its long routes. Such an aircraft may not be a candidate for a comprehensive ETS.

Thus, even though the development of comprehensive ETS systems may result in some reduction of tug use for some aircraft, there may remain many aircraft for which a comprehensive ETS is not economically justifiable. These aircraft without a comprehensive ETS may still require tug use.

As can be seen, there is a need for system that will allow an aircraft to depart from a gate and move at low speed into a position from which the aircraft may begin taxiing under its own power without use of a tug. More particularly, there is a need for such a system that may be installed on an aircraft at a low enough cost and with a low enough weight so that it may be economically justifiable for a wide range of aircraft, irrespective of utilization patterns of the aircraft.

SUMMARY OF THE INVENTION

In one aspect of the present invention, a gate departure system for an aircraft comprises an electric traction motor for driving a wheel of a main landing gear assembly of the aircraft on only one side of the aircraft; and a controller selectively connected to a starter-generator of an auxiliary power unit (APU) and to the traction motor to control flow of electrical power to either the starter-generator for starting of the APU or the electric traction motor for driving the wheel.

In another aspect of the present invention, apparatus for moving an aircraft comprises. a traction motor for driving a wheel of a main landing gear of the aircraft on only one side of the aircraft; and a steering system to counteract rotational force imposed on the aircraft by the traction motor during forward or reverse movement of the aircraft, the steering system including; a direction sensor for sensing direction of forward or reverse movement of the aircraft and a nose wheel angle error indicator coupled to receive and integrate signals from the direction sensor.

In still another aspect of the present invention, a method for moving an aircraft away from a gate comprises the steps of driving a wheel of a main landing gear assembly on only one side of the aircraft to produce forward or reverse movement of the aircraft; and orienting a nose wheel of the aircraft to counteract rotational force imposed on the aircraft during the forward or reverse movement.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an on-board wheel driving system for an aircraft. More particularly, the invention provides a low-cost and lightweight system that is capable of driving a wheel of an aircraft at a relatively low speed suitable for pushback and movement into a position from which the aircraft may begin taxiing under its own power during departure from a terminal gate.

Figure 1:
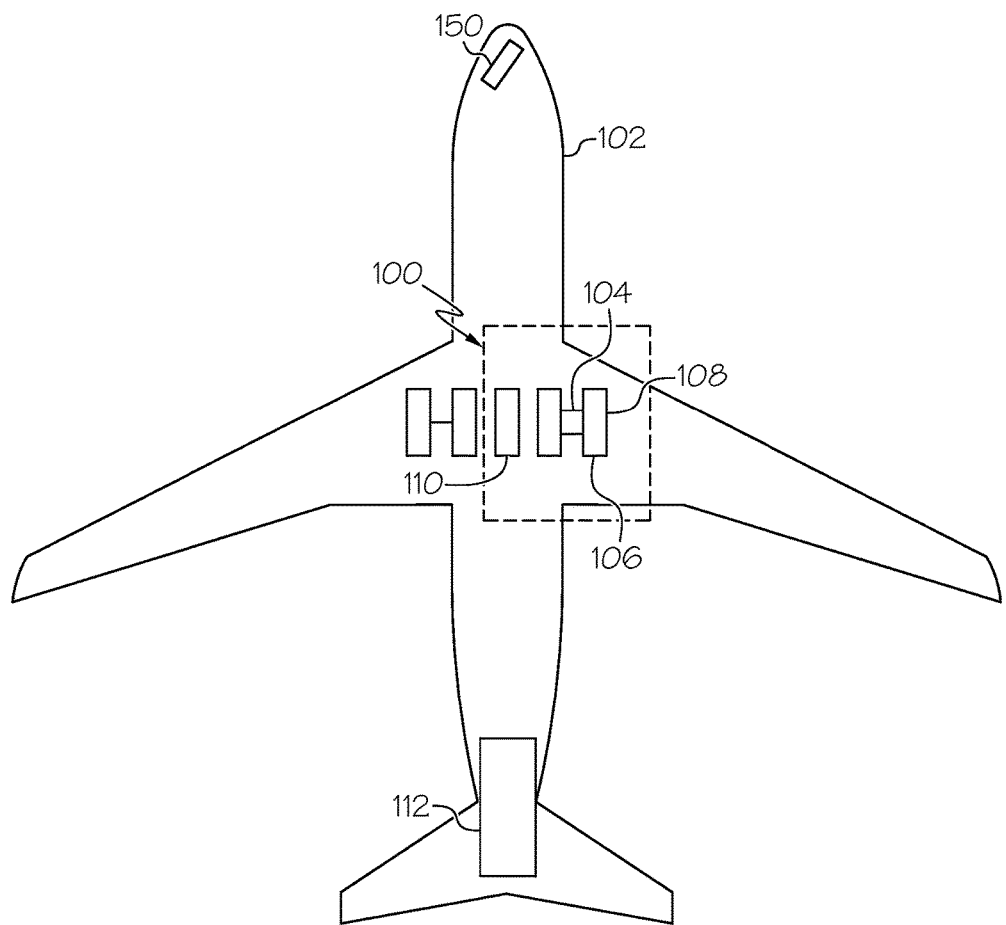
FIG. 1 is a schematic plan view of an aircraft equipped with an on-board gate departure system in accordance with an exemplary embodiment of the invention.

Referring now to FIG. 1, a schematic plan view illustrates an exemplary embodiment of on-board gate departure system 100 installed on an aircraft 102. The gate departure system 100 may include an electric traction motor 104 that may be selectively coupled through a clutch 152 to drive a wheel 106 of a main landing gear assembly 108 on only one side of the aircraft 102. The gate departure system 100 may also include a control assembly 110 for controlling flow of electrical power from an auxiliary power unit (APU) 112 to the traction motor 104.

The gate-departure system 100 may be less costly and may have a lower overall weight than a comprehensive electric taxi system (ETS), such as that shown in US Patent Publication 20120104159 and incorporated herein by reference. As compared to a comprehensive ETS with multiple traction motors and controllers, the present system may include only one traction motor 104. The traction motor 104 may be provided with controlled electrical power through a starter-generator control unit (SGCU). The SGCU may be selectively connected to a starter-generator of the auxiliary power unit (APU) and to the traction motor 104 to control flow of electrical power to either the starter-generator for starting of the APU or the electric traction motor for driving the wheel 106. In that regard, the traction motor 104 may be controlled with an SGCU that would otherwise be installed on the aircraft to control starting of an auxiliary power unit (APU). In other words, the traction motor 104 may be controlled without incurring additional cost and weight associated with a separate, dedicated traction motor controller.

Figure 2:
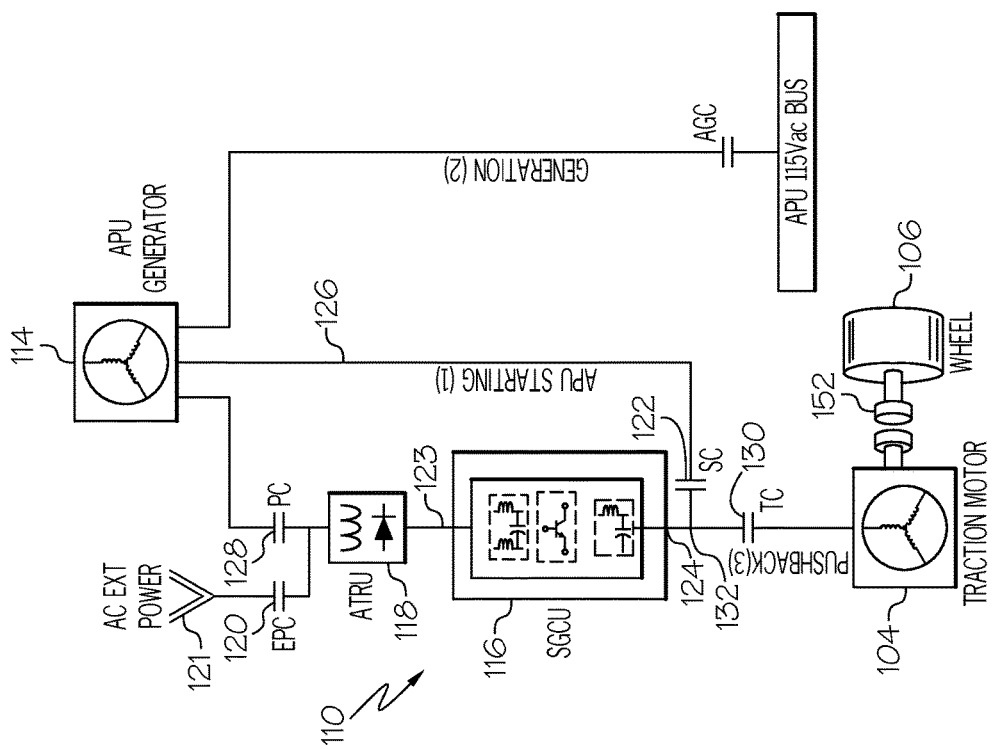
FIG. 2 is an a schematic diagram of a controller assembly of the gate departure system of FIG. 1 in accordance with an exemplary embodiment of the invention.

Referring now to FIG. 2, a schematic diagram illustrates an exemplary embodiment of the control assembly 110. The control assembly 110 may include a starter-generator control unit (SGCU) 116 and an autotransformer rectifier unit (ATRU) 118 coupled to an input 123 of the SGCU 116. The SGCU 116 and the ATRU 118 may each serve dual purposes on the aircraft 102. In a first role, the SGCU 116 and the ATRU 118 may provide power configuration and control for starting the APU 112. In a second role, the SGCU 116 and the ATRU 118 may provide power configuration and control for the traction motor 104.

An SGCU and an ATRU may be pre-existing components of a typical commercial aircraft with an APU. In accordance with the present invention, these pre-existing components may be selectively connected through various contactors so that they may also be employed to control the traction motor 104. Thus, an APU-equipped aircraft may be provided with an on-board gate departure system of the present invention without incurring a cost and weight penalty that might otherwise arise from providing separate power conditioning and control devices for a traction motor.

Dual use of the SGCU 116 and ATRU 118 may be implemented by positioning and operating various contactors in the control assembly 110. An external power contactor (EPC) 120 may be interposed between an external power source 121 and the ATRU 118. A starter contactor (SC) 122 may be interposed between an output 124 of the SGCU 116 and a starter-generator 114 of the APU 112.

With the EPC 120 and the SC 122 closed, a controlled-power path 126 may pass from the external power source 121, through the ATRU 118 and the SGCU 116, and into the starter-generator 114. In that context, the SGCU 116 may control starting of the APU 112.

With the EPC 120 open, a power contactor (PC) 128 closed, the SC 122 open, and a traction contactor (TC) 130 closed, a controlled-power path 132 may pass from the starter-generator 114, through the ATRU 116 and the SGCU 118, and into the traction motor 104. In that context, the SGCU 116 may control operation of the traction motor 104.

Figure 3:
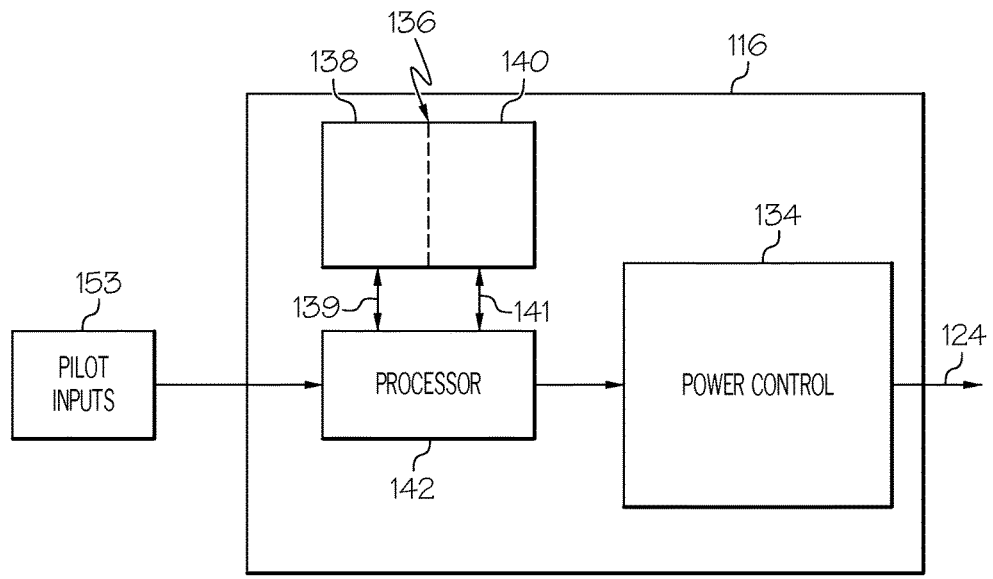
FIG. 3 is a block diagram of a portion of the gate departure system of FIG. 1 in accordance with an exemplary embodiment of the invention.

Referring now to FIG. 3, a block diagram illustrates that the SGCU 116 may include a non-transitory computer-readable medium with instructions stored thereon, referred to herein as a memory block 136. The SGCU 116 may also include a power control block 134 and a processor 142. The memory block 136 may be segmented into an APU-start instruction block 138 and a traction motor instruction block 140. The power control block 134 may provide controlled current to the starter-generator 114 when start instructions 139 are provided to the power control block 134 by the APU-start instruction block 138. The power control block 134 may provide controlled current to the traction motor 104 when wheel-drive instructions 141 are provided to the power control block 134 by the traction motor instruction block 138.

Figure 4:
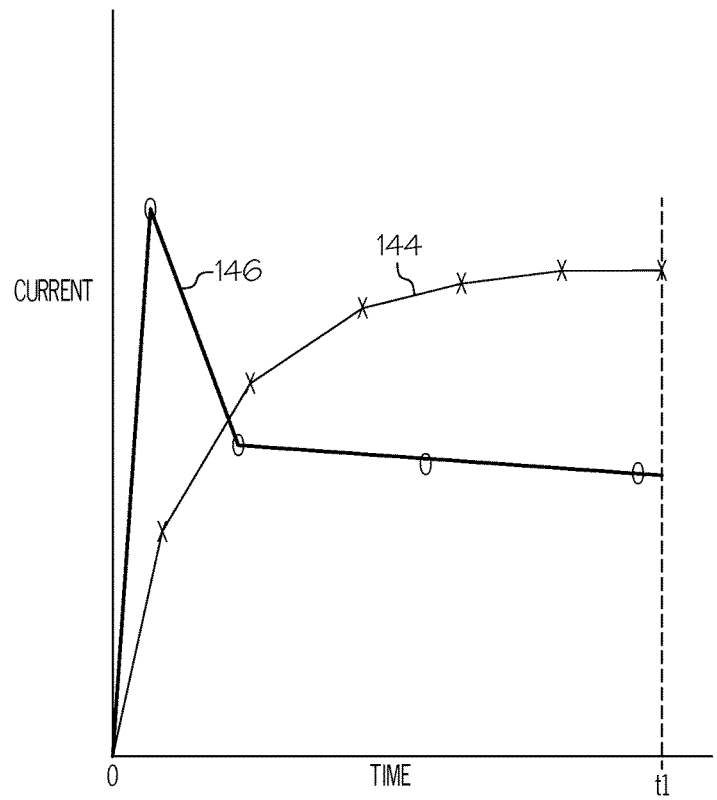
FIG. 4 is a plot of time versus current patterns of the gate departure system of FIG. 1 in accordance with an exemplary embodiment of the invention.

Referring now to FIG. 4, a current versus time plot 144 illustrates that the APU-start instruction block 138 may provide a sequence of instructions that may result in a predetermined sequence of rotational accelerations of an engine of the APU 112 to bring the engine up to a proper speed to initiate ignition. A time-line pattern of current provided to the starter generator 114 is illustrated on the curve 144 of FIG. 4. Similarly, the wheel-drive instruction block 141 may provide a sequence of instructions that may result in predetermined rotation sequence of the traction motor 104 that includes an initial rotor-to-clutch alignment rotation and a predetermined sequence of movement of the traction motor 104. This traction motor movement sequence may include an initial acceleration that may require break-away torque. Initial acceleration may be followed by a fixed rate of rotation of the traction motor 104. In an exemplary embodiment, the fixed rate of rotation may result in a steady-state movement of the aircraft at speed of about 1.5 knots to about 2 knots. A time-line pattern of current provided to the traction motor is illustrated on the graph curve 146.

In an exemplary embodiment of the gate-departure system 100, a combination of size of the traction motor 104, size of the starter-generator 114 and the sequences of instructions provided by the instruction blocks 138 and 140 may be selected so that:

$$\int_0^{t1} Is\,dt > \int_0^{t1} It\,dt \qquad (1)$$

where:
Is=current to starter generator 114 of APU 112;
It=current to traction motor 104;
t=time; and
t1=elapsed time to APU ignition.

It may be seen that the left half of equation 1 may characterize a degree to which the power control block 134 may experience load-related heating during APU starting within a time period $t_1$. The right hand side of equation 1 may characterize load-related heating of the power control block 134 during movement of the aircraft within the time period $t_1$. Current provided to the traction motor 104 during initial acceleration may be greater than a maximum current provided to the starter-generator 114 during APU stating. Nevertheless, overall heating of the power control block 134 during use of the traction motor 104 may remain within design limits established for block 134 in the context of the SGCU 116 being employed to control starting of the APU 112.

In other words, the SGCU 116 may be sufficiently robust so that it may be effectively employed to control the traction motor 104 even if the traction motor 104 has a momentary current draw that may be higher than a maximum current draw of the starter-generator 114. Indeed, the SGCU 116 may perform effectively even if the traction motor 104 has a current rating higher than a current rating of the starter-generator 114. The gate departure system 100 may be retrofitted into any aircraft with pre-existing SGCU for an APU; and such retrofitting may be made without a need to modify the power control block 134 of a preexisting SGCU. Such retrofitting may only require introduction of software to produce requisite instructions for operation of the traction motor 104.

The gate departure system 100 may be implemented with only one traction motor. As compared to a comprehensive ETS with multiple traction motors, advantageous cost and weight savings may result from utilizing only a single traction motor to propel the aircraft 102 during gate departure maneuvers. These savings arise from a combination of factors. First of all, a single motor has a lower overall cost and weight than multiple traction motors. Secondly, a single traction motor may be controlled with only a single controller, whereas an ETS with multiple traction motors requires multiple motor controllers. In the system 100, the SGCU 116 may be used as the requisite single controller for controlling the single traction motor 104.

The single traction motor 104 may be selectively coupled, through a clutch 152 (See FIG. 2), to drive a wheel 106 of the main landing gear assembly 108 on either the left or right side of the aircraft 102. The aircraft 102 may subjected to a rotational force when the traction motor 104 drives one of the wheels 106 on only one side of the aircraft 102. For example, a front end of the aircraft may be subjected to a rotational force that may tend to drive the front end in a clockwise direction when the traction motor 104 drives a right-hand one of the wheels 116 to produce reverse movement of the aircraft 102.

Such a rotational force may be counteracted by orienting a nose wheel 150 (See FIG. 1) in a direction that steers the front end of the aircraft in a counterclockwise direction. Thus with proper nose wheel steering, the aircraft 102 may be successfully pushed back from a gate on a straight path even though only one wheel on one side of the aircraft may be driven in a reverse direction.

But a counterintuitive or non-obvious design choice has been made in the context of the gate departure system 100 of the present invention. The gate departure system 100 may be employed to slowly move an aircraft. from a gate (e.g., at a speed of 2 knots or less). When the aircraft 102 moves slowly, the nose wheel 150 may subjected to relatively low stress even if the nose wheel is oriented at a high angle relative to an axis of the aircraft. Thus, the aircraft 102 may be moved away from a gate with a single motor driving a wheel on only one side of the aircraft and steered in a straight line without exposing the nose wheel to excessive stress.

Figure 5:
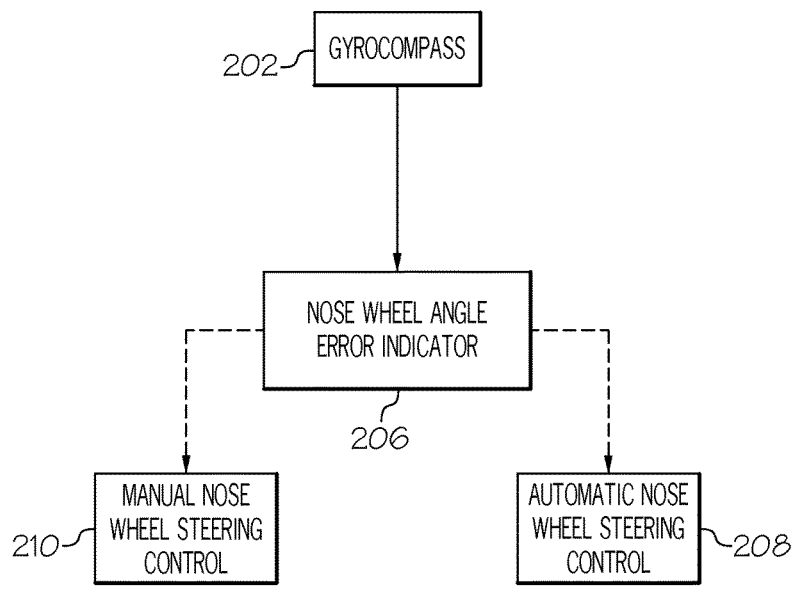
FIG. 5 is a block diagram of a nose wheel steering system in accordance with an exemplary embodiment of the invention.

Referring now to FIG. 5, a block diagram illustrates an exemplary embodiment of an aircraft steering system 200 which may be employed during operation of the gate departure system 100 of FIG. 1. The steering system may include a direction sensor such as a gyrocompass 202 and a nose wheel angle error indicator 206. The steering system 200 may optionally include an automatic nose wheel steering device 208. Alternatively, the system 200 may be operated with a manual nose wheel steering control 210.

Figure 6:
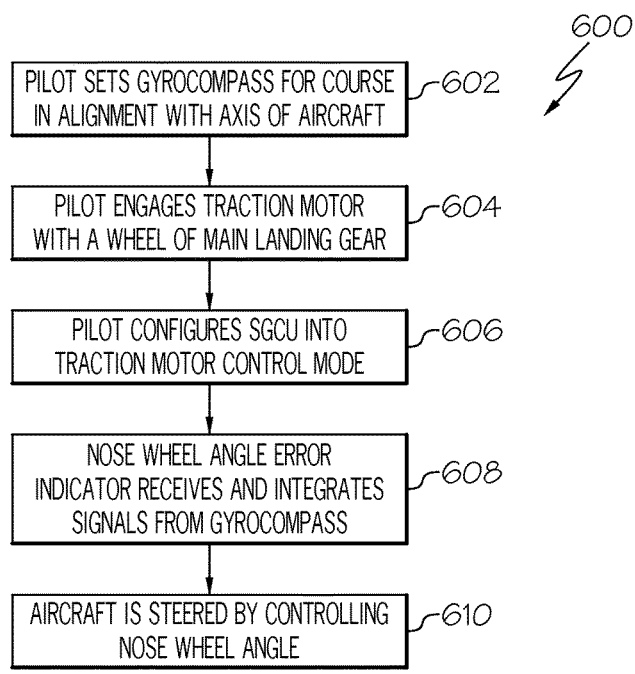
FIG. 6 is a flow chart of a method for performing gate departure of an aircraft in accordance with an exemplary embodiment of the invention.

Referring now to FIG. 6, a flow chart illustrates an exemplary embodiment of a method 600 for performing pushback during a gate departure maneuver of the aircraft 102. In a step 602, a pilot may set a direction sensor to a course that is aligned with a longitudinal axis of an aircraft, (e.g., the gyrocompass 202 may be set to a course in alignment with an axis of the aircraft 102). In a step 604, the pilot may engage a traction motor with a wheel of a main landing gear assembly of the aircraft, (e.g., the pilot may operate the engagement contactor (not shown) to activate a clutch 152 and thereby engage the traction motor 104 with the wheel 106). In a step 606, the pilot may operate a gate departure pilot input control to configure an SGCU into a traction motor control mode (e.g., The pilot input control 153 may be operated so that the contactors EPC 120 and SC 122 may be opened and the contactors PC 128 and TC 130 may be closed. The processor 142 of the SGCU 116 may deliver the traction motor instructions from the memory block 136 to the power control block 134). In a step 608, a nose wheel angle error indicator may begin receiving and integrating signals from the direction sensor and a nose wheel angle sensor to produce nose wheel steering instructions for maintaining a course of the aircraft on a straight line aligned with the axial orientation in which the aircraft was positioned at a gate, (e.g., the nose wheel angle error indicator 206 may begin receiving and integrating signals from the gyrocompass 202 and the nose wheel angle sensor 204 to produce steering instructions for the nose wheel 150). In a step 610, the aircraft may be steered by controlling nose wheel angle (e.g., the pilot may observe the nose wheel angle error indicator 206 and manually steer the nose wheel 150 at achieve straight line aircraft travel. Alternatively, the automatic nose wheel steering control may provide nose wheel steering to achieve straight line aircraft travel It should be understood, of course, that the foregoing relates to exemplary embodiments of the invention and that modifications may be made without departing from the spirit and scope of the invention as set forth in the following claims.

We claim:
1. A gate departure system for an aircraft comprising:
an electric traction motor for driving a wheel of a main landing gear assembly of the aircraft on only one side of the aircraft;
a controller selectively connected to a starter-generator of an auxiliary power unit (APU) and to the traction motor to control flow of electrical power to either the starter-generator for starting of the APU or the electric traction motor for driving the wheel;
an autotransformer rectifier unit (ATRU) interposed between the starter-generator and an input of the controller;
an external power source contactor (EPC) interposed between an external power source and the ATRU;
a starter contactor (SC) interposed between an output of the controller and the starter-generator;
a power contactor (PC) interposed between the starter-generator and the ATRU; and
a traction contactor (TC) interposed between the output of the controller and the traction motor;
wherein, upon starting of the APU, the EPC and the SC are closed and the PC and the TC are open; and
wherein, upon driving of the wheel, the PC and the TC are closed and the EPC and the SC are open.
2. The system of claim 1 wherein the controller includes:
a processor; and
a memory block comprising a non-transitory computer-readable medium with instructions stored thereon, that when executed by the processor, performs the steps;

a) instructs the controller to control electrical power flow to the starter-generator to start an engine of the APU in accordance with a desired starting sequence, or
b) instructs the controller to control electrical power flow to the electric traction motor to rotate the traction motor in accordance with a predetermined rotation sequence.

3. The system of claim 2 wherein the predetermined traction motor rotation sequence includes an initial rotor-to-clutch alignment rotation.

4. The system of claim 2 wherein the predetermined traction motor rotation sequence includes initial acceleration followed by steady state driving of the aircraft at a speed of about 1.5 to about 2 knots.

5. The system of claim 2 wherein the instructions stored on the memory block limit output of the controller in accordance with the expression:

$$\int_0^{t1} Isdt > \int_0^{t1} Itdt$$

where:
Is=current to the starter generator;
It=current to traction motor;
t=time; and
t1=elapsed time to ignition of the APU.

6. The system of claim 1 wherein a current rating of the traction motor is higher than a current rating of the starter-generator.

\* \* \* \* \*